(12) United States Patent
Yoshizawa et al.

(10) Patent No.: US 10,378,137 B2
(45) Date of Patent: Aug. 13, 2019

(54) METHOD OF SEWING PROCESS FOR TRIM COVER OF VEHICLE SEAT AND VEHICLE SEAT USING SAME

(71) Applicant: TACHI-S CO., LTD., Akishima-shi, Tokyo (JP)

(72) Inventors: Hisayuki Yoshizawa, Tokyo (JP); Motoshi Minegishi, Tokyo (JP); Tsunaki Nishida, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 351 days.

(21) Appl. No.: 15/296,957

(22) Filed: Oct. 18, 2016

(65) Prior Publication Data

US 2017/0114485 A1    Apr. 27, 2017

(30) Foreign Application Priority Data

Oct. 26, 2015   (JP) ................................. 2015-209792

(51) Int. Cl.
 *B60N 2/58*   (2006.01)
 *D05B 3/00*   (2006.01)

(52) U.S. Cl.
 CPC ............. *D05B 3/00* (2013.01); *B60N 2/5883* (2013.01); *B60N 2/5891* (2013.01)

(58) Field of Classification Search
 CPC ........ B60N 2/835; B60N 2/832; B60N 2/859; B60N 2/5883
 USPC ......................................................... 112/876
 See application file for complete search history.

(56) References Cited

U.S. PATENT DOCUMENTS

| | | | |
|---|---|---|---|
| 6,925,947 B2* | 8/2005 | Lin | ........................ D05C 17/00 112/439 |
| 2009/0146483 A1 | 6/2009 | Niwa et al. | |
| 2018/0334066 A1* | 11/2018 | Marques | .............. B60N 2/7017 |

FOREIGN PATENT DOCUMENTS

| | | |
|---|---|---|
| CN | 101450785 A | 6/2009 |
| DE | 20307988 U1 | 10/2004 |
| JP | 5-40798 Y2 | 10/1993 |
| JP | 2000-201780 A | 7/2000 |
| JP | 2007-159627 A | 6/2007 |
| JP | 2012-081091 A | 4/2012 |

OTHER PUBLICATIONS

Office Action, dated Aug. 3, 2018, in Chinese Application No. 201610949724.X.

* cited by examiner

*Primary Examiner* — Tajash D Patel
(74) *Attorney, Agent, or Firm* — Shapiro, Gabor and Rosenberger, PLLC

(57) ABSTRACT

Regarding a method of a sewing process for a trim cover of a vehicle seat provided with a decorative band, conventionally, a decorative band made up of a covering and wadding is sewn to a member of a trim cover similarly made up of a covering and wadding. Because of this, an area where a decorative band is sewn has an increased thickness, causing discomfort when an occupant sits. To address this, in the example embodiment, a sewn covering is manufactured by sewing together coverings for a portion of a trim cover and a decorative band and sewing decorative stitching through the sewn ends, and then the sewn covering and wadding are overlaid on each other to sew their borders together. This makes it possible to reduce the thickness of an area where the decorative band is sewn and reduce the discomfort when an occupant sits.

4 Claims, 3 Drawing Sheets

METHOD OF SEWING PROCESS FOR TRIM COVER OF VEHICLE SEAT AND VEHICLE SEAT USING SAME

CLAIM OF PRIORITY

The present application claims priority from Japanese Patent application serial No. 2015-209792, filed on Oct. 26, 2015, the content of which is hereby incorporated by reference into this application.

BACKGROUND OF THE INVENTION (1) Field of the Invention

The present invention relates to a vehicle seat and, more particularly, to a method of a sewing process for a trim cover of the vehicle seat provided with a decorative band.

(2) Description of the Related Art

In recent years, in the vehicle seats, suggestions have been made concerning seats added with a strip-shaped decorative band (also called a character pattern) with external appearance design in mind.

A trim cover covering a vehicle seat conventionally includes a component made up of a plurality of sheets of covering and wadding joined to one another. The sewing process of the vehicle seat with the decorative band requires the sewing of the decorative band to a portion of the trim cover.

For example, Japanese Examined Utility Model Application Publication No. Hei (1993) 5-40798 is known as background art in the technical field. Japanese Examined Utility Model Application Publication No. Hei 5 (1993)-40798 discloses a sewn covering cover used for a vehicle seat. The sewn covering cover is used to envelope the vehicle seat, which includes a band-plate-shaped basic core material, an auxiliary core material similarly formed in a band-plate shape, and a covering material. An end of the covering material is placed between the basic core material and the auxiliary core material. These materials are sewn together at each of both ends of the basic core material in the width direction. The covering material is folded back outward with respect to the basic core material, in order to create a deep hollow having a bottom formed by the basic core material and extending between the folding-back portions of the covering materials which are located opposite to each other.

In Japanese Examined Utility Model Application Publication No. Hei 5 (1993)-40798, the covering material having a backside laminated with slab urethane is sewn to both widthwise ends of the basic core material similarly laminated with slab urethane and then the covering material is folded back outward with respect to the basic core material to form the sewn covering cover. Japanese Examined Utility Model Application Publication No. Hei 5 (1993)-40798 makes no mention of the sewing of a decorative band, but using the technique disclosed in this publication leads to sewing a decorative band made up of a covering and wadding to a member of a trim cover similarly made up of a covering and wadding. In short, the coverings with the wadding are sewn together. In this case, the sewing is performed on the coverings together with the wadding. As a result, the area where the decorative band is sewn has an increased thickness, giving rise to a disadvantageous problem of occupant discomfort when he/she sits.

The present invention has been made in light of these circumstances and it is an object of the present invention to address the shortcoming of a vehicle seat provided with a decorative band as described above.

SUMMARY OF THE INVENTION

To attain the object, the present invention provides, by way of example, a method of a sewing process for a trim cover of a vehicle seat provided with a decorative band. The method includes the steps of manufacturing a sewn covering by sewing a covering for a portion of a trim cover and a covering to form a decorative band to each other before sewing decorative stitching through ends of the coverings thus sewn together; and overlaying the sewn covering and wadding on each other in order to sew borders of the sewn covering and the wadding together.

According to one aspect of the present invention, it is possible to provide a method of a sewing process for a trim cover of a vehicle seat that enables a reduction in thickness of an area where a decorative band is sewn to reduce the discomfort when an occupant sits in the seat, and the vehicle seat produced by using the same.

DETAILED DESCRIPTION OF THE PREFERRED EMBODIMENTS

An embodiment in accordance with the present invention will now be described with reference to the accompanying drawings, by way of example only.

Embodiment

Figure 1:
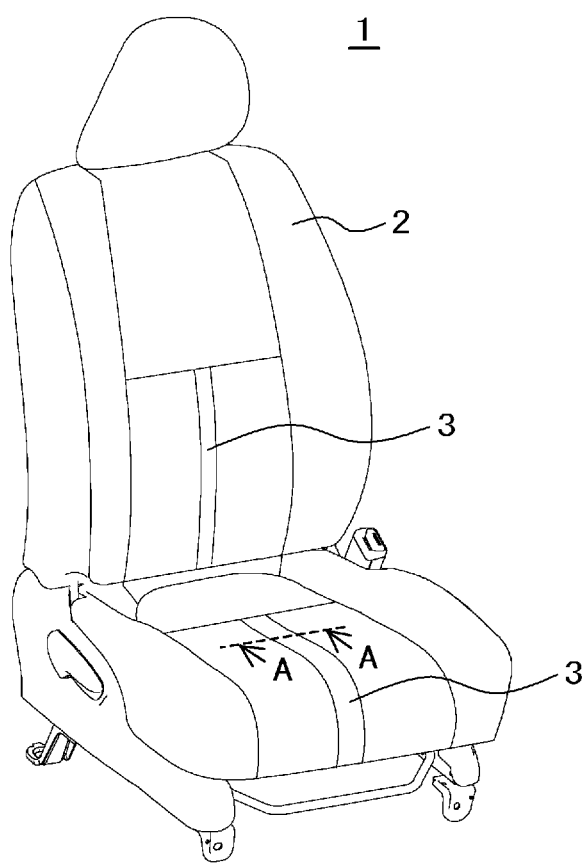
FIG. 1 is an external view of a seatback of a vehicle seat according to an embodiment.

FIG. 1 is an external view of a vehicle seat in accordance with the embodiment, in which reference numeral 1 denotes the vehicle seat covered with a trim cover 2 into which a sheet-shaped cover is sewn. Reference numeral 3 also denotes a strip-shaped decorative band for improved design quality. Here, manufacturing a vehicle seat provided with a decorative band requires sewing the decorative band 3 to a member forming part of the trim cover 2.

Figure 2A:
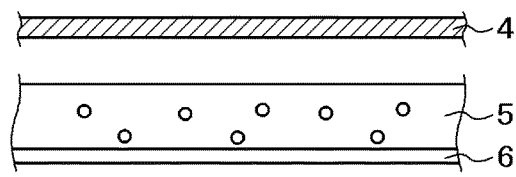
FIGS. 2A to 2C are explanatory views illustrating a conventional sewing process for a decorative band and FIGS. 3A to 3D are explanatory views illustrating a sewing process for a decorative band in accordance with the embodiment.
Figure 2B:
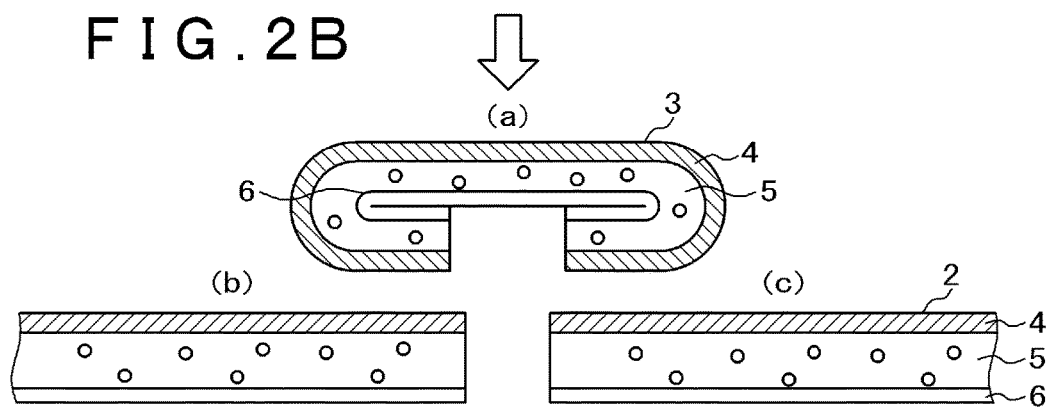
Figure 2C:
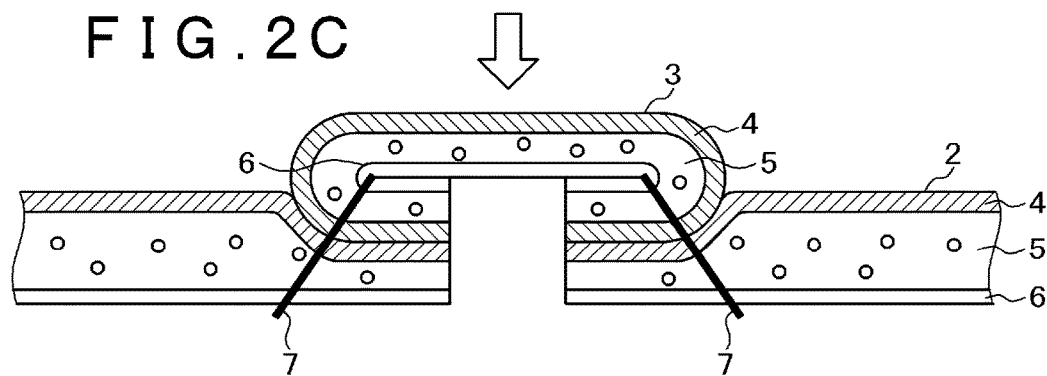

FIG. 2A to FIG. 2C are explanatory diagrams illustrating a conventional sewing process for a decorative band 3. FIG. 2C shows a sectional view of an area at and around the decorative band 3 as conventionally known, taken along line A-A of FIG. 1. FIG. 2A and FIG. 2B show the manufacturing steps to achieve FIG. 2C.

In FIG. 2A, a covering 4 which is to be material, and an element made up of wadding 5 and a wadding cover 6 (hereinafter simply referred to as "wadding 5" including the wadding cover 6 unless otherwise specified) are prepared. As illustrated in FIG. 2B, the covering 4, the wadding 5 and the wadding cover 6 are combined together to fabricate members (a), (b) and (c). The member (a) is cut out for use for the decorative band 3. The members (b) and (c) correspond to portions of the trim cover 2 to which the decorative band 3 is to be joined. The opposing ends of the member (a) are folded back such that the covering 4 faces outward, and then the members (a), (b) and (c) are sewn together to form the decorative band 3 as illustrated in FIG. 2C. In this respect, for producing the members (a), (b) and (c) illustrated in FIG. 2B, the manufacturing process varies by material properties of the covering 4. Initially, if the covering 4 is synthetic leather or fabrics, the covering 4 and the wadding 5 are combined together by bonding. A sheet-shaped set of the covering 4 and the wadding 5 which have been bonded together throughout the surface area is cut into sizes required by the respective members (a), (b) and (c) for manufacture. If the covering 4 is leather, such surface bonding causes wrinkles, so that the bonding is not performed, and instead of this, after the sheet-shaped set of the covering 4 and the wadding 5 are cut into sizes required by the respective members (a), (b) and (c), the borders of the covering 4 and the wadding 5 are sewn together for manufacture. Incidentally, the border areas may be bonded together instead.

Thus, as illustrated in FIG. 2C, the decorative band 3 made up of the covering 4 and the wadding 5 is sewn to the portions of the trim cover 2 similarly made up of the covering 4 and the wadding 5 with a sewing thread 7 in order to attach the decorative band 3 to the trim cover 2 for a vehicle seat.

In this respect, in the conventional sewing process for the decorative band 3 as illustrated in FIG. 2A to FIG. 2C, the decorative band 3 made up of the covering 4 and the wadding 5 is sewn to the trim cover 2. This gives rise to an increase in thickness of an area of the decorative band 3 after the sewing process, which may in turn disadvantageously cause occupant discomfort when he/she sits in the seat.

To address this, in the embodiment, a covering 4 without wadding 5 is subjected to the sewing process before the covering 4 is combined with the wadding 5, in order to reduce the thickness of an area of the decorative band 3 for a reduction in discomfort when an occupant sits in the seat. The embodiment will now be described in detail with reference to the drawings.

Figure 3A:
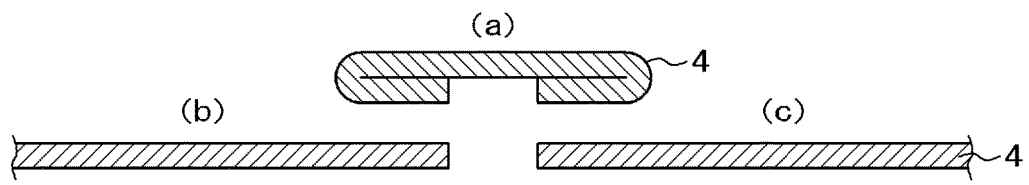
Figure 3B:
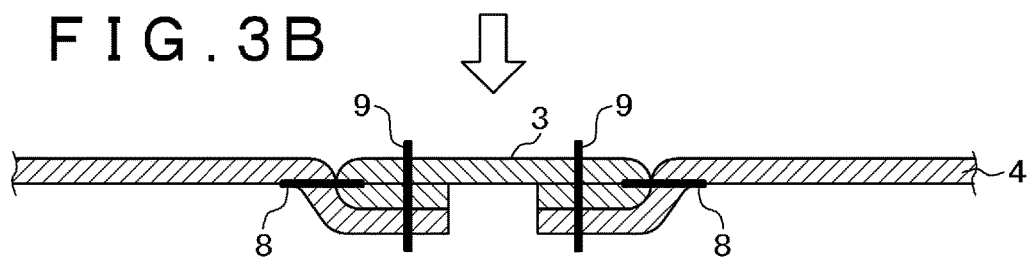
Figure 3C:
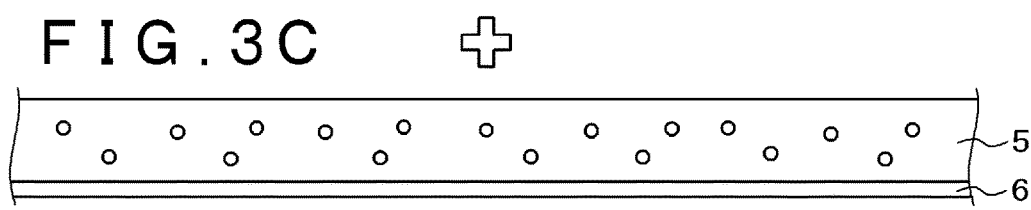
Figure 3D:
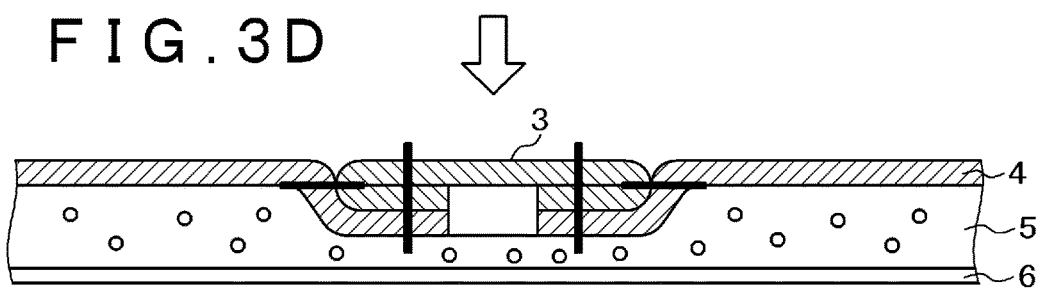

FIG. 3A to FIG. 3D are explanatory diagrams illustrating the sewing process for a decorative band 3 in accordance with the embodiment. FIG. 3D is a sectional view of an area at and around the decorative band 3 in the embodiment, taken along line A-A in FIG. 1. FIG. 3A, FIG. 3B and FIG. 3C illustrate the manufacturing steps to achieve FIG. 3D.

In FIG. 3A, coverings 4 which are to be material are prepared as members (a), (b) and (c) cut out into sizes required by the respective members (a), (b) and (c). The member (a) is the covering 4 which has been cut out for the decorative band 3, and has the opposing ends folded back. The members (b) and (c) are the coverings 4 corresponding to portions of the trim cover 2 to which the decorative band 3 is to be joined.

Next, as illustrated in FIG. 3B, the members (a), (b) and (c) are sewn together. Here, the coverings 4 are sewn to each other with a sewing thread 8 as illustrated in FIG. 3B. Further, decorative stitching is sewn with a sewing thread 9 through the ends thus sewn together such that the sewing thread 9 is exposed on the sheet surface to manufacture a sewn covering material. The decorative band 3 is thus formed, and also the edges of the decorative band 3 after the sewing process are flattened to reduce the floating caused by the sewn ends, resulting in a thinner thickness of an area of the decorative band 3. It should be noted that the sewing of the coverings 4 to each other and the decorative stitching at the sewn ends may be simultaneously performed.

Then, the sewn covering material manufactured as shown in FIG. 3B and the element made up of the wadding 5 and the wadding cover 6 illustrated in FIG. 3C are sewn together at their borders in order to combine the sewn covering material and the wadding 5 with each other. Incidentally, the borders of the sewn covering material and the element may be bonded to each other instead. Thus, the trim cover 2 with the decorative band 3 illustrated in FIG. 3D can be manufactured.

In this manner, the embodiment relates to a method of a sewing process for a trim cover 2 of a vehicle seat 1 with a decorative band 3, which includes the steps of: manufacturing a sewn covering by sewing a covering 4 for a portion of the trim cover 2 and a covering 4 to form the decorative band 3 to each other before sewing decorative stitching through ends of the coverings 4 thus sewn together; and overlaying the sewn covering and wadding 5 on each other in order to sew borders of the sewn covering and the wadding 5 together.

Further, a vehicle seat 1 with a decorative band 3 is structured to include a sewn covering formed by sewing a covering 4 to form part of a trim cover 2 of the vehicle seat 1 and a covering 4 to form the decorative band 3 to each other and then sewing decorative stitching through ends of the coverings 4 thus sewn together, the sewn covering and wadding 5 being overlaid on each other to be sewn together at their borders. Further, a method of a sewing process for a trim cover 2 of a vehicle seat 1 with a decorative band 3 includes the steps of: cutting a covering 4 used for the decorative band 3 and a covering 4 to form part of the trim cover 2 into required sizes; manufacturing a sewn covering by sewing the covering 4 thus cut to be used for the decorative band 3 and the covering 4 thus cut to form part of the trim cover 2 to each other and sewing decorative stitching through ends of the coverings 4 thus sewn together; overlaying the sewn covering and wadding 5 on each other in order to sew borders of the sewn covering and the wadding 5 together.

According to the embodiment, therefore, the thickness of an area of the decorative band 3 consists of the thickness of the covering 4 alone, achieving a thinner thickness. As a result, a reduction in discomfort when an occupant sits in the seat can be achieved. In addition, the advantageous effect of reducing the amount of usage of wadding 5 can be produced.

If the covering 4 is leather, it is conventionally necessary to sew together the borders of the wadding 5 and the covering 4 for each piece cut out into a size required by each member (a), (b), (c). However, in the embodiment, what is required is simply that the border of the sewn covering material after the sewing process is sewn to the wadding 5, producing the advantageous effect of reducing the need of the sewing process of wadding 5.

Further, the thickness of an area of the decorative band 3 is able to be reduced by sewing decorative stitching through the sewn ends after the covering 4 of the decorative band 3 and the covering 4 of the trim cover 2 are sewn together in order to sew and flatten the edges created after the sewing process. Further, because the edges are flattened when the border sewing is performed in the sewing process of the wadding 5, the need to hold the edges is eliminated, producing the advantageous effect of improving the workability.

Although the embodiment has been described, it should be understood that the present invention is not limited to the disclosed embodiment, but on the contrary, is intended to cover various modifications. Further, the disclosed embodiment has been described in detail for purposes of clarity of understanding the present invention, and therefore the present invention is not necessarily limited to the details of the full structure described herein. The structure of the embodiment may be also partially substituted by other structures.

What is claimed is:

1. A method of a sewing process for a trim cover of a vehicle seat provided with a decorative band, comprising:

manufacturing a sewn covering by sewing a covering for a portion of a trim cover and a covering to form a decorative band to each other before sewing decorative stitching through ends of the coverings thus sewn to each other; and overlaying the sewn covering and wadding on each other in order to sew borders of the sewn covering and the wadding together, wherein when the covering for the portion of the trim cover and the covering to form the decorative band are sewn together, an end of the covering to form the decorative band is folded back for the sewing.

2. The method of the sewing process for the trim cover of the vehicle seat according to claim 1, wherein the wadding has a wadding cover.

3. A vehicle seat having a decorative band, comprising:

a sewn covering formed by sewing a covering to form part of a trim cover of the vehicle seat and a covering to form the decorative band to each other and then sewing decorative stitching through an end of the coverings thus sewn to each other; and a wadding, wherein the sewn covering and the wadding are overlaid on each other and sewn together at their borders, and wherein in the sewing of the covering to form part of the trim cover and the covering to form the decorative band, an end of the covering to form the decorative band is folded back for the sewing.

4. A method of a sewing process for a trim cover of a vehicle seat provided with a decorative band, comprising:

cutting a covering used for the decorative band and a covering to form part of the trim cover into required sizes;

manufacturing a sewn covering by sewing the covering thus cut to be used for the decorative band and the covering thus cut to form part of the trim cover to each other and sewing decorative stitching through ends of the coverings thus sewn to each other; and overlaying the sewn covering and wadding on each other in order to sew borders of the sewn covering and the wadding together, wherein, when the covering thus cut to be used for the decorative band and the covering thus cut to form part of the trim cover are sewn together, an end of the covering thus cut to be used for the decorative band is folded back for the sewing.

* * * * *